United States Patent
Takase et al.

(10) Patent No.: US 7,562,803 B2
(45) Date of Patent: Jul. 21, 2009

(54) FRICTION SPOT JOINT STRUCTURE

(75) Inventors: Kenji Takase, Hiroshima (JP); Tomoyuki Iwashita, Hiroshima (JP); Kikuo Kato, Hiroshima (JP); Toshiyuki Gendou, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 148 days.

(21) Appl. No.: 11/727,480

(22) Filed: Mar. 27, 2007

(65) Prior Publication Data

US 2007/0170229 A1    Jul. 26, 2007

Related U.S. Application Data

(62) Division of application No. 11/011,064, filed on Dec. 15, 2004, now abandoned.

(30) Foreign Application Priority Data

Feb. 16, 2004    (JP) .............................. 2004-037708

(51) Int. Cl.
*B23K 20/12* (2006.01)

(52) U.S. Cl. ..................................... 228/112.1; 228/2.1

(58) Field of Classification Search ........................ None
See application file for complete search history.

(56) References Cited

U.S. PATENT DOCUMENTS

| | | | |
|---|---|---|---|
| 4,831,711 A | 5/1989 | Rapp | |
| 5,051,020 A | 9/1991 | Schleicher | |
| 5,432,989 A | 7/1995 | Turek | |
| 5,517,743 A | 5/1996 | Liebig et al. | |
| 5,984,563 A | 11/1999 | Wu | |
| 6,325,584 B1 | 12/2001 | Marko et al. | |
| 6,802,682 B2 | 10/2004 | Stevenson et al. | |
| 6,843,405 B2 | 1/2005 | Okamoto et al. | |
| 2001/0045447 A1* | 11/2001 | Kano et al. | 228/112.1 |
| 2003/0141343 A1* | 7/2003 | Murakami | 228/112.1 |
| 2004/0168297 A1 | 9/2004 | Nishimura et al. | |
| 2005/0001010 A1* | 1/2005 | Koga et al. | 228/2.1 |
| 2005/0029331 A1* | 2/2005 | Kano et al. | 228/112.1 |
| 2005/0035180 A1* | 2/2005 | Nishiguchi et al. | 228/112.1 |
| 2006/0163326 A1* | 7/2006 | Murakami | 228/101 |

(Continued)

FOREIGN PATENT DOCUMENTS

EP        1 153 694        11/2001

(Continued)

OTHER PUBLICATIONS

European Search Report dated Jun. 9, 2005 Application No. EP 05 00 1841.

*Primary Examiner*—Kiley Stoner
(74) *Attorney, Agent, or Firm*—Studebaker & Brackett PC; Donald R. Studebaker

(57) ABSTRACT

In a friction spot joint structure, a first plate member is pressed against a second plate member by using a rotary tool and a receiving member. A concave portion is formed by a rotating pin portion of the rotating tool, with an interface between the first plate member and the second plate member remained. In this time, the first and second plate members are allowed to plastic-flow, so that an annular bulging portion of the second plate member raised into the first plate member is formed around the concave portion.

4 Claims, 6 Drawing Sheets

U.S. PATENT DOCUMENTS

2006/0231594 A1* 10/2006 Murakawa et al. ....... 228/112.1

FOREIGN PATENT DOCUMENTS

| | | |
|---|---|---|
| EP | 1 291 115 | 3/2003 |
| JP | 2002-292479 | 10/2002 |
| JP | 2003-117668 | 4/2003 |
| JP | 2003305576 A * | 10/2003 |
| WO | WO 98/04381 | 2/1998 |

* cited by examiner

FRICTION SPOT JOINT STRUCTURE

CROSS REFERENCE TO RELATED APPLICATIONS

This application is Divisional of U.S. application Ser. No. 11/011,064 filed Dec. 15, 2004.

This Non-provisional application claims priority under 35 U.S.C. § 119(a) on Patent Application No. 2004-037708 filed in Japan on Feb. 16, 2004, the entire contents of which are hereby incorporated by reference.

BACKGROUND ART

1. Field of the Invention

The present invention relates to a friction spot joint structure in which a plurality of plate members are overlapped and joined by plastic-flowing the plate members.

2. Description of the Prior Art

It has been known conventionally that light metals, particularly aluminum and the like are unsuitable for fused joint such as welding, compared with steels, because they are more conductive and transfer more heat than steels.

Taking the above into consideration, friction spot joint structure has been known in which plate members are point joined by fusing a part thereof by friction, for example, as disclosed in Japanese Patent Application Laid Open Publication No. 2002-292479A. In detail, in a friction spot joint apparatus including: a rotary tool having a pin portion at its tip end and a shoulder portion of a diameter larger than that of the pin portion at the base end of the pin portion; and a receiving member arranged so as to face the rotary tool in the axial direction of the rotation axis, first and second plate members overlapped with each other are interposed between the rotary tool and the receiving member, the pin portion is pressed into the first plate member and the second plate member, while rotating the rotary tool, and the shoulder portion is pressed against the first plate member in the axial direction by, whereby the plate members are point joined.

In the conventional friction spot joint structure, the pressure and number of rotation of the rotary tool and the joining period must be adjusted precisely. However, the adjustment is difficult because the relationship between the joint quality and such joining conditions is unclear. Hence, variation of the joint quality becomes large. Further, the point joint is performed by fusing plate materials by friction, which requires a considerable time period.

SUMMARY OF THE INVENTION

The present invention has been made in view of the above problems and has its object of obtaining a joint structure of constant joint quality at high joint strength by devising a joint structure of two plate members.

To attain the above object, the plate members are joined by mechanical joint in the present invention.

Specifically, the first invention is directed to a friction spot joint structure in which a fist plate member and a second plate member are point joined with each other by plastic flow in a manner that using a rotary tool having: a pin portion at a tip end thereof and a shoulder portion having a larger diameter than that of the pin portion at a base end of the pin portion; and a receiving member arranged so as to face the rotary tool in an axial direction of a rotary axis, the first plate member and the second plate member overlapped with each other is interposed between the rotary tool and the receiving member, the pin portion is pressed into the first plate member while rotating the rotary tool, and the shoulder portion is pressed against the first plate member in the axial direction.

The friction spot joint structure includes: a concave portion formed by the pin portion and including a continuous interface between the first plate member and the second plate member; and an annular bulging portion of the second plate member which protrudes by plastic flow into the first plate member around an entire outer periphery of the concave portion.

With the above structure, the continuous interface between the first plate member and the second plate member exists. Therefore, the pressed second plate member plastic-flows into the first plate member in a solid phase state when the first and the second plate members interposed between the rotary tool and the receiving member are softened by friction heat caused at the rotating shoulder and pin portions. Thus, that the first plate member and the second plate member are joined to each other mechanically, forming the annular bulging portion around the concave portion. The joint strength depends on the size of a mechanically joined part of the bulging portion, which can be easily adjusted by changing joining conditions such as the pressure and number of rotation of the rotary tool, the joining period and the like. Hence, a target joint strength can be obtained constantly.

Further, the continuous interface remains between the first plate member and the second plate member at the bottom of the concave portion, and therefore, stress concentration is hard to be invited compared with the case with a discontinuous interface. Accordingly, cracking is prevented and the shear fracture strength is increased. Furthermore, the second plate member is not exposed to the wall face forming the concave portion. Therefore, in the case using a material having an anti-corrosion characteristic as the first plate member, even if the second plate member is inferior in anti-corrosion characteristic, the anti-corrosion characteristic at the joint part is ensured and easy quality management for surface treatment, coating and the like can be attained because the same material exists continuously in the surface portion.

In the second invention, a protruding portion is formed so as to protrude outward from the annular bulging portion. By this formation, the protruding portion of the second plate member encroaches into the first plate member outward from the bulging portion, whereby, the protruding portion exhibits an effect as an anchor to increase the strength against a load in a direction of force to separate the first plate member from the second plate member.

In the third and fourth inventions, the first plate member and the second plate member are made of a light metal. In light metals having small specific gravities, such as aluminum, magnesium, plastic flow in a solid phase state is easily caused at comparatively low temperatures. Hence, with the light metal employed, the effects of the present invention are remarkably exhibited.

DESCRIPTION OF THE PREFERRED EMBODIMENTS

Embodiments of the present invention will be described below with reference to accompanying drawings. Wherein, the following embodiments are preferred examples essentially and do not intend to limit application, use and scope of the present invention.

Construction of Joint Gun

Figure 1:
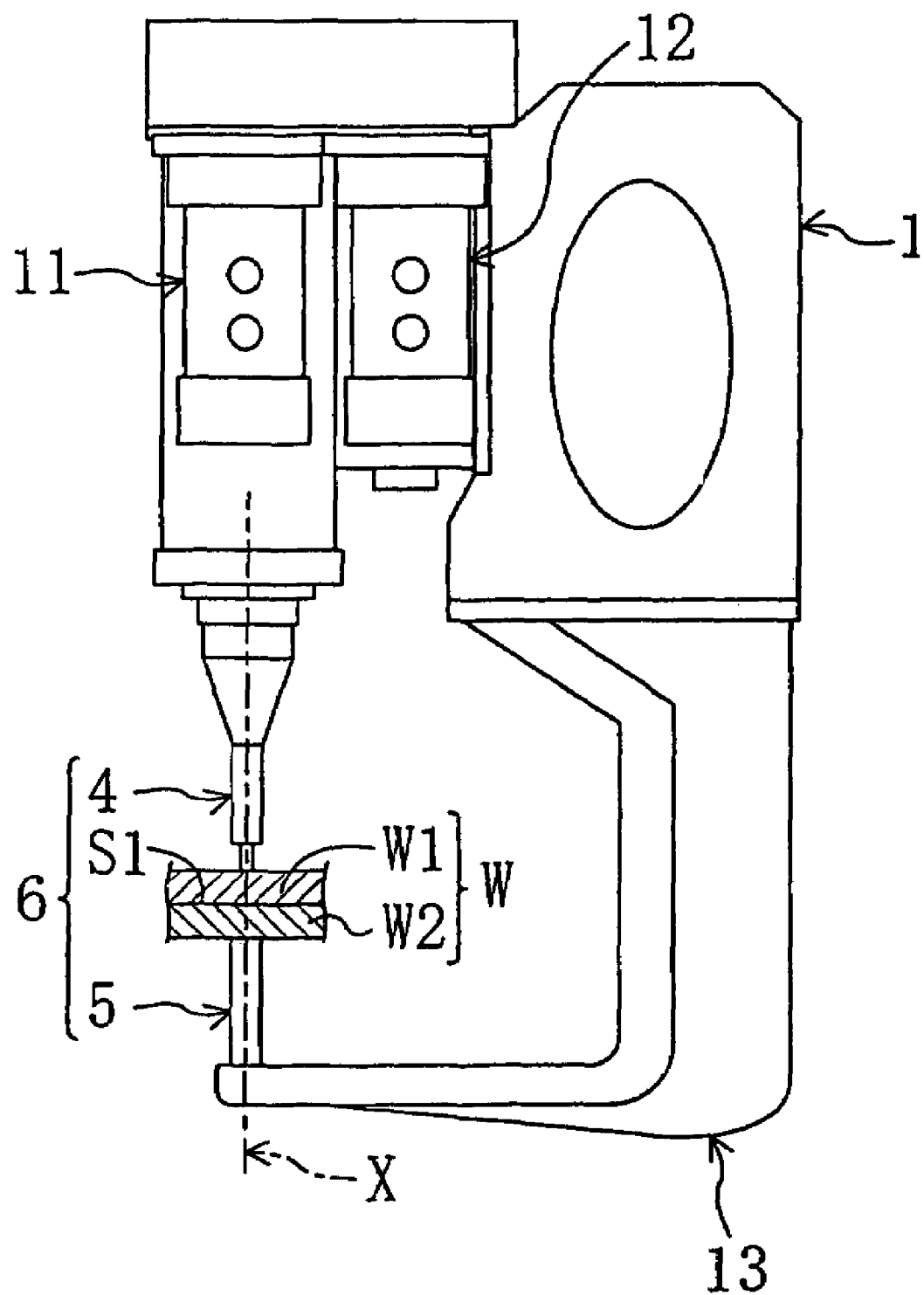
FIG. 1 is a side view showing a joint gun.

FIG. 1 shows a joint gun 1 installed in a friction point joining apparatus (the whole construction is not shown.) according to the embodiments of the present invention. The joint gun 1, which is fitted to, for example, a wrist of a robot, is provided for point-joining a plurality of plate members made of a light metal such as an aluminum alloy, a magnesium alloy, a zinc alloy used for bodies and the like of automobiles in a state that they are overlapped with each other in the thickness direction thereof, to form a friction joint structure. The joint gun 1 includes a joint tool 6 composed of a rotary tool 4 and a receiving member 5, and the rotary tool 4 and the receiving member 5 interpose a part to be joined of a work W, which is composed of a first plate member W1 and a second plate member W2 overlapped with each other in the thickness direction thereof.

Figure 2:
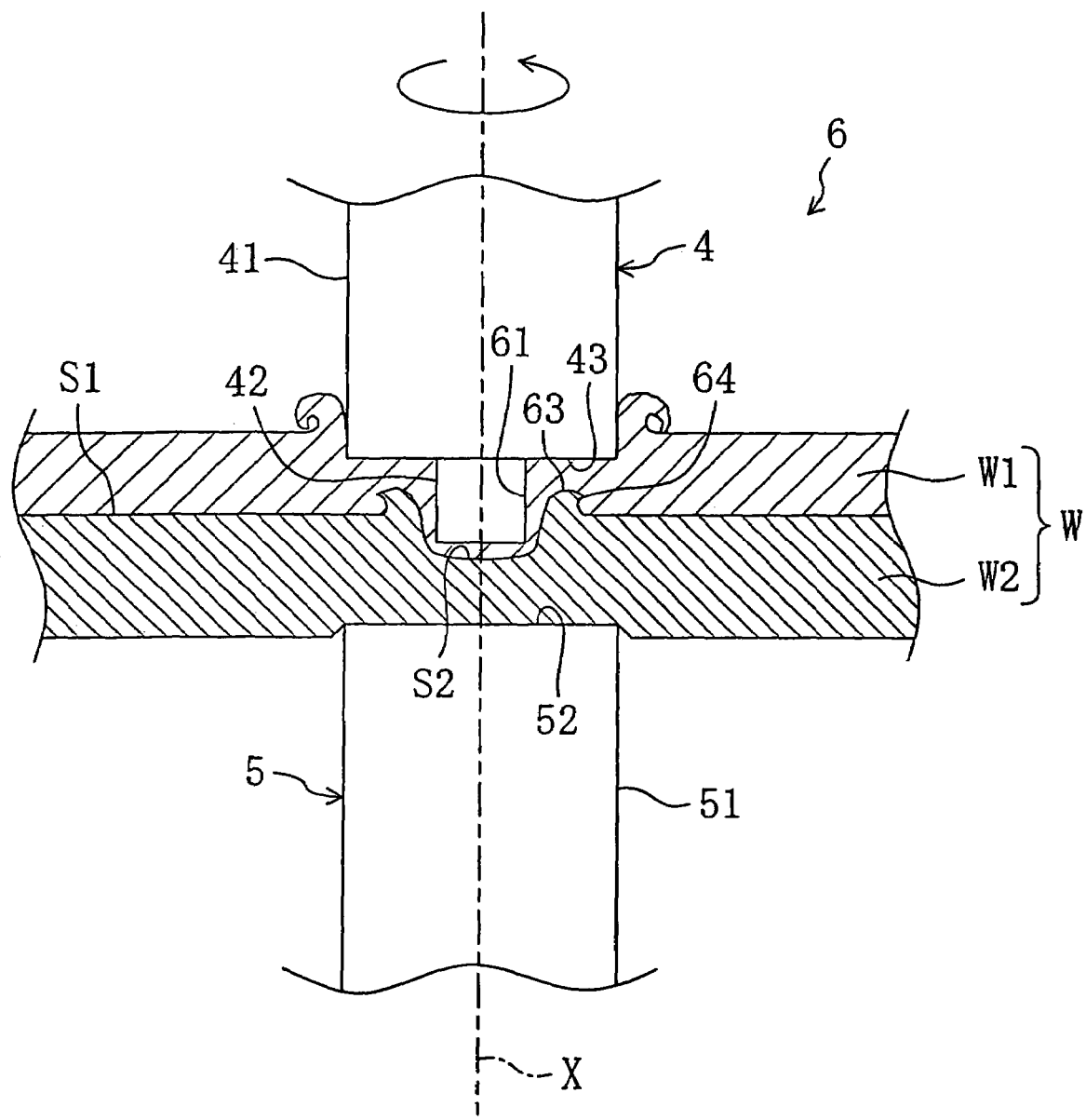
FIG. 2 is a section showing, in an enlarged scale, a friction spot joint structure according to an embodiment of the present invention.

As schematically shown in FIG. 2, the rotary tool 4 includes a pin portion 42 in a column shape at a tip end portion 41 thereof, and a shoulder portion 43 of which diameter is larger than the diameter of the pin portion 42 is formed at the tip end portion 41 on the base end side of the pin portion 42.

The rotary tool 4 is arranged along a rotation axis X (axial line) intersecting at a right angle with an overlap plane S1 between the first and second plate members W1, W2 of the work W, and is rotated around the rotation axis X by a rotary shaft motor 11. Further, the rotary tool 4 moves up and down along the rotation axis X by a pressing shaft motor 12. The first and second plate members W1, W2 may be made of the same material or different materials and its combination is not limited only if each of them is made of a light metal.

The receiving member 5 is formed of a main body 51 in column shape having a top face 52 of which shape and area are substantially the same as or larger than those of the tip end portion 41 of the rotary tool 4. Further, the receiving member 5 is mounted in the rotary axis X to the tip end of a substantially L-shaped arm 13 so as to face the rotary tool 4, with the work W interposed.

Work Joining Sequence

As shown in FIG. 2, the rotary tool 4 is rotated around the rotation axis X by the rotary shaft motor 11 of the joint gun 1. After the number of rotation of the rotary tool 4 reaches a predetermined value, the rotary tool 4 is brought down by the pressing shaft motor 12 so as to be in contact with the surface of the work W (first plate member W1), while rotating the rotary tool 4. In so doing, the work W is interposed between the rotary tool 4 and the receiving member 5 and is pressed in the direction of the rotation axis X (downward in FIG. 2). In this manner, the pin portion 42 of the rotary tool 4 is pressed into the work W. On the other hand, the receiving member 5 supports the work W at a top face 52 thereof. By this supporting, the pressure of the rotary tool 4 to the work W is received at the top face 52 of the receiving member 5, thereby preventing the work W from deformation toward the receiving member 5.

Next, the rotary tool 4 is further pressed toward the work W, while rotating the rotary tool 4. In this association, the pin portion 42 of the rotary tool 4 is squeezed into the first plate member W1, to generate heat. Further, after the pin portion 42 is buried in the first plate member W1, the shoulder portion 43 of the rotary tool 4 and the surface of the first plate member W1 are rubbed against each other to generate friction heat. The thus generated friction heat is transferred from the first plate member W1 to the second plate member W2, thereby softening the second plate member W2.

The rotation and the pressing of the rotary tool 4 are continued to generate plastic flow in the rotation direction in the first and second plate members W1, W2. The further continuation of the rotation and the pressing of the rotary tool 4 increases the range of the plastic flow in the work W.

Furthermore, when the pin portion 42 and the shoulder portion 43 are rotated and press the first plate member W1 toward the second plate member W2, the pin portion 42 and shoulder portion 43 are buried into the work W and a concave portion 61 is formed by the pin portion 42, with a continuous interface S2 between the first plate member W1 and the second plate member W2 remained. In this time, the first and second plate members W1, W2 plastic-flow in a solid phase state and the second plate member W2 pressed between the rotary tool 4 and the receiving member 5 flows outward in radial direction of the concave portion 61 into a part of the first plate member W1 where internal pressure is smaller than the side wall face of the concave portion 61. In this association, an annular bulging portion 63 is formed in the first plate member W1 so as to surround the concave portion 61 with the rotation axis X as a center. Accompanied by the rotation of the shoulder portion 43, further plastic flow is caused outward in the radial direction around the annular bulging portion 63, so that a protruding portion 64 protruding outward in the radial direction is formed around the annular bulging portion 63. The protruding portion 64 of the second plate member W2 encroaches in and is joined to the first plate member W1.

After continuation of the plastic flow in the work W for a given period of time in this way, the rotary tool 4 is raised by the pressing shaft motor 12, while rotating the rotary tool 4, so that the rotary tool 4 is pulled out from the work W.

Thereafter, the work W is cooled quickly to be hardened, thereby completing the joining of the work W.

Effects of Embodiment

In the friction spot joint structure according to the above embodiment, the concave portion 61 is formed by the pin portion 42, with the continuous interface S2 between the first plate member W1 and the second plate member W2 remained by pressing the first plate member W1 toward the second plate member W2 between the rotary tool 4 and the receiving member 5, and the annular bulging portion 63 of the second plate member W2 is formed which protrudes into the first plate member W1 by plastic flow of the first and second plate members W1, W2. The joint strength depends on the size of a mechanically joined part of the bulging portion 63, which can be easily adjusted by changing joining conditions such as the pressure and number of rotation of the rotary tool 4, a joining period and the like. Accordingly, a target joint strength can be obtained constantly. Further, with the interface S2, the shear fracture strength is increased and easy quality management for surface treatment, coating and the like are attained.

Moreover, the protruding portion 64 formed around the bulging portion 63 exhibits an effect as an anchor, thereby increasing the strength against a load in a direction of force to separate the joint part.

In addition, the first and second plate members W1, W2 are made of a light metal, which easily causes plastic flow in a solid phase state, thereby remarkably exhibiting the effects of the present embodiment.

Modified Example of Embodiment

The receiving member 5 is fixed in the above embodiment but may be movable in the rotation axis X. Further, the receiving member 5 is formed of the column shaped main body 51 having the top face 52 of which shape and area are substantially the same as or larger than those of the tip end portion 41 of the rotary tool 4 in the present invention, but the receiving member 5 may be in a plate shape.

WORKING EXAMPLES

Working Examples that were performed practically will be described next.

Working Example 1

Referring to the work W, a 6000 series aluminum alloy of 1 mm in thickness was used as the first plate member W1 and a 3000 series aluminum alloy of 1 mm in thickness was used as the second plate member W2. The work W was joined using the aforementioned friction point joining apparatus.

Specifically, the rotary tool 4 having the shoulder portion 43 of 8 mm in diameter was used, the pressure and number of rotation thereof were set to 3.42 kN and 2500 rpm, respectively, and a plurality of joint parts were formed in a single work W with the joining period changed per 0.1 sec. Then, the work W was cut into joint parts per joining period to observe each section thereof. Further, the tensile shear strength of each joint part per joining period was measured.

Figure 3:
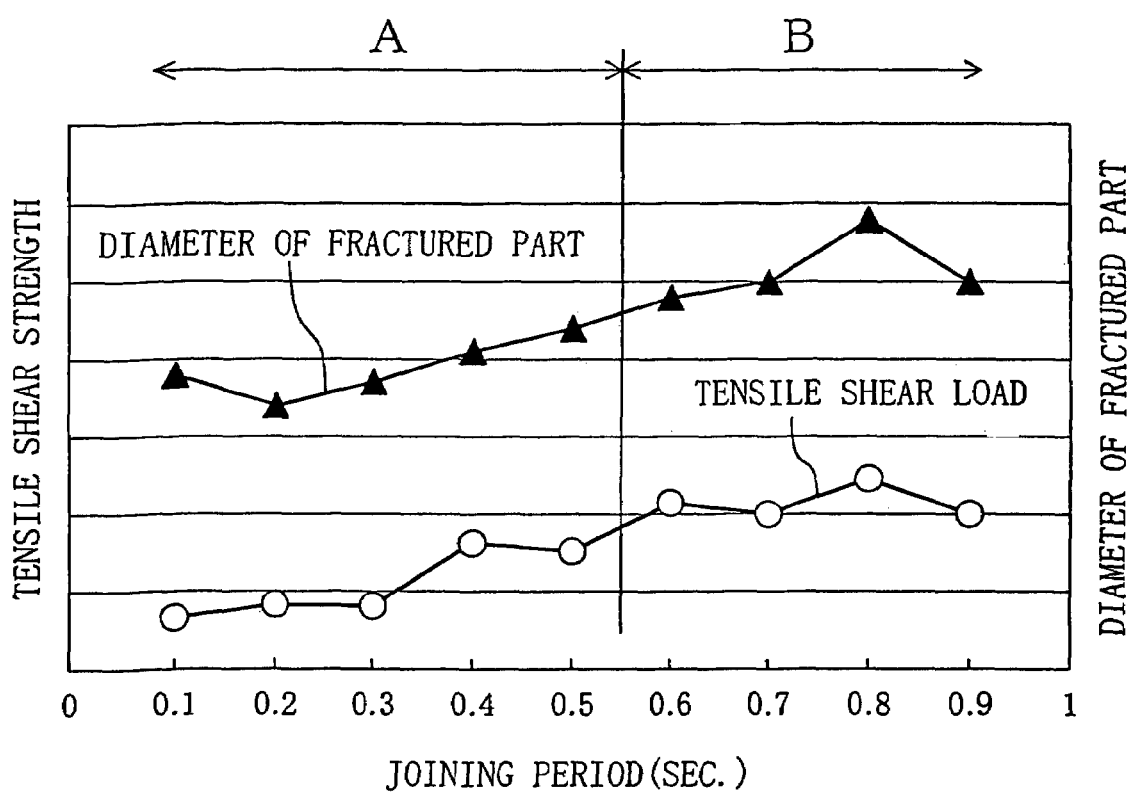
FIG. 3 is a graph illustrating dependencies of a diameter of a fractured part and tensile shear strength on a joining period in the friction spot joint structure according to Embodiment 1.
Figure 4:
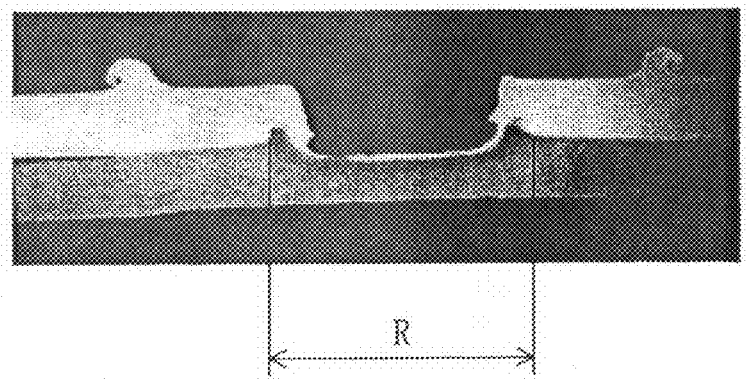
FIG. 4 is a section showing a joint part obtained at joining period of 0.4 sec.
Figure 5:
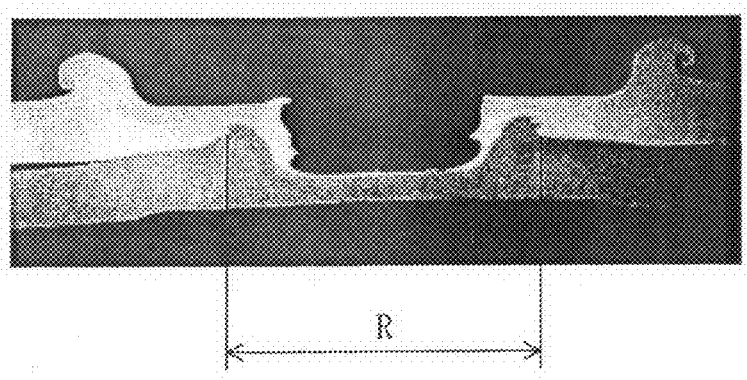
FIG. 5 is a view corresponding to FIG. 4 and showing a joint part obtained at joining period of 0.7 sec.
Figure 6:
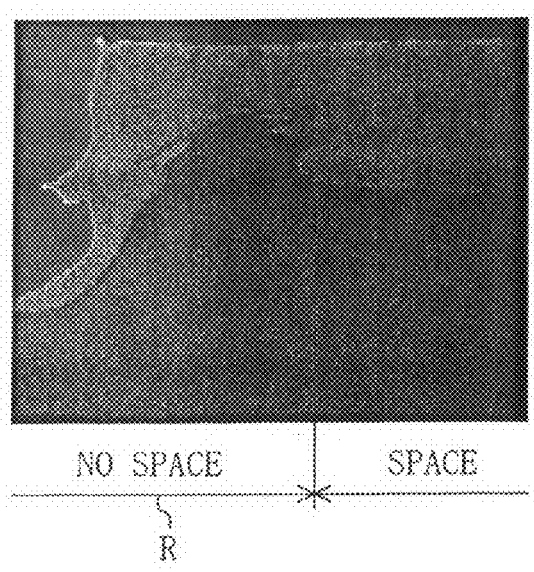
FIG. 6 is a section showing, in an enlarged scale, a bulging portion in FIG. 5.

FIG. 3 shows studied results of dependencies of diameters R of fractured parts and tensile shear strength on the joining period. FIG. 4 is a section showing the joint part obtained at the joining period of 0.4 sec., and FIG. 5 is a section showing the joint part obtained at the joining period of 0.7 sec. Each diameter R of the fractured parts correspond substantially to the maximum diameter of the bulging portion 63 and to an effective diameter of a mechanically joined part in the overlap plane S1 between the first plate member W1 and the second plate member W2. Specifically, as shown in an enlarged scale in FIG. 6, the first plate member W1 and the second plate member W2 were mechanically joined to each other in a range of the diameter R of the fractured part with no space. On the other hand, though not appearing in the drawing, a minute space between the first plate member W1 and the second plate member W2 was observed at the outside of the range of the diameter R.

As can be understood from comparison of FIG. 4 with FIG. 5, by setting joining period longer, the bulging portion 63 grows and the diameter R of the fractured part is increased. In other words, it is found that, as shown in FIG. 3, the diameter R of the fractured part is increased as the joining period is longer to some extent, accompanying increase in tensile shear strength. When the joining period is 0.7 sec., the protruding portion 64 is formed at the bulging portion 63, as shown in an enlarged scale in FIG. 6, and the tensile shear strength is further increased. It should be noted that it is found that in the case where the joining period is longer than a given period (0.8 sec in the present working example), the tensile shear strength is reduced contrarily because the first plate member W1 at the interface S2 becomes too thin, and so on.

A range B in FIG. 3 indicates a range of the joint period where the fractured part is formed in a button shape (annular) in a plan view in the tensile shear test, and the most excellent joint strength was obtained in this range B. A range A indicates a range of the joint period where the fractured part in a plan view is discontinuous and does not form an annular shape in the tensile shear test. In the range A, the joint strength was lower than in the range B. Wherein, in the joining period of 0.4 sec., the annular bulging portion 63 was formed as shown in FIG. 4, and the tensile shear strength was increased.

As described above, the size of the mechanically joined part, that is, the diameter R of the fractured part can be easily adjusted by changing the joining conditions such as the pressure and number of rotation of the rotary tool 4, the joining period and the like, and therefore, it was found that a target joint strength can be obtained constantly.

Working Example 2

Figure 7:
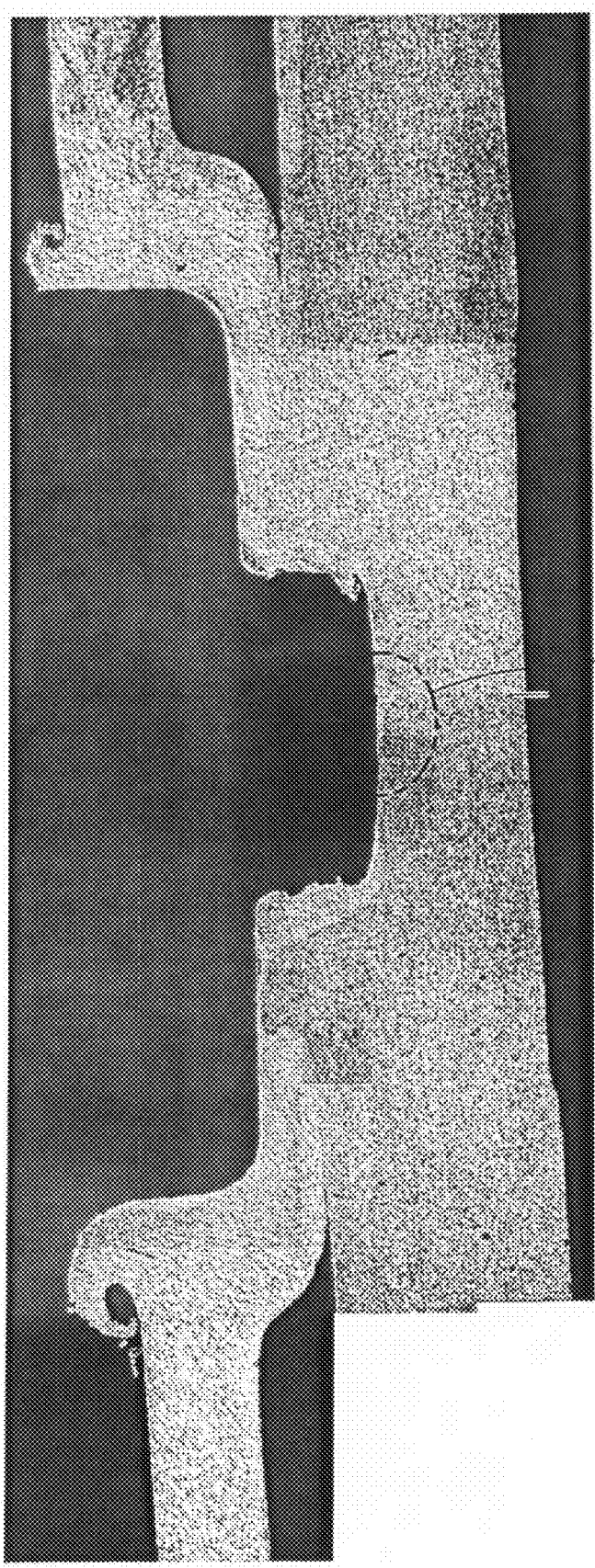
FIG. 7 is a section showing a joint part in a friction spot joint structure according to Embodiment 2.
Figure 8:
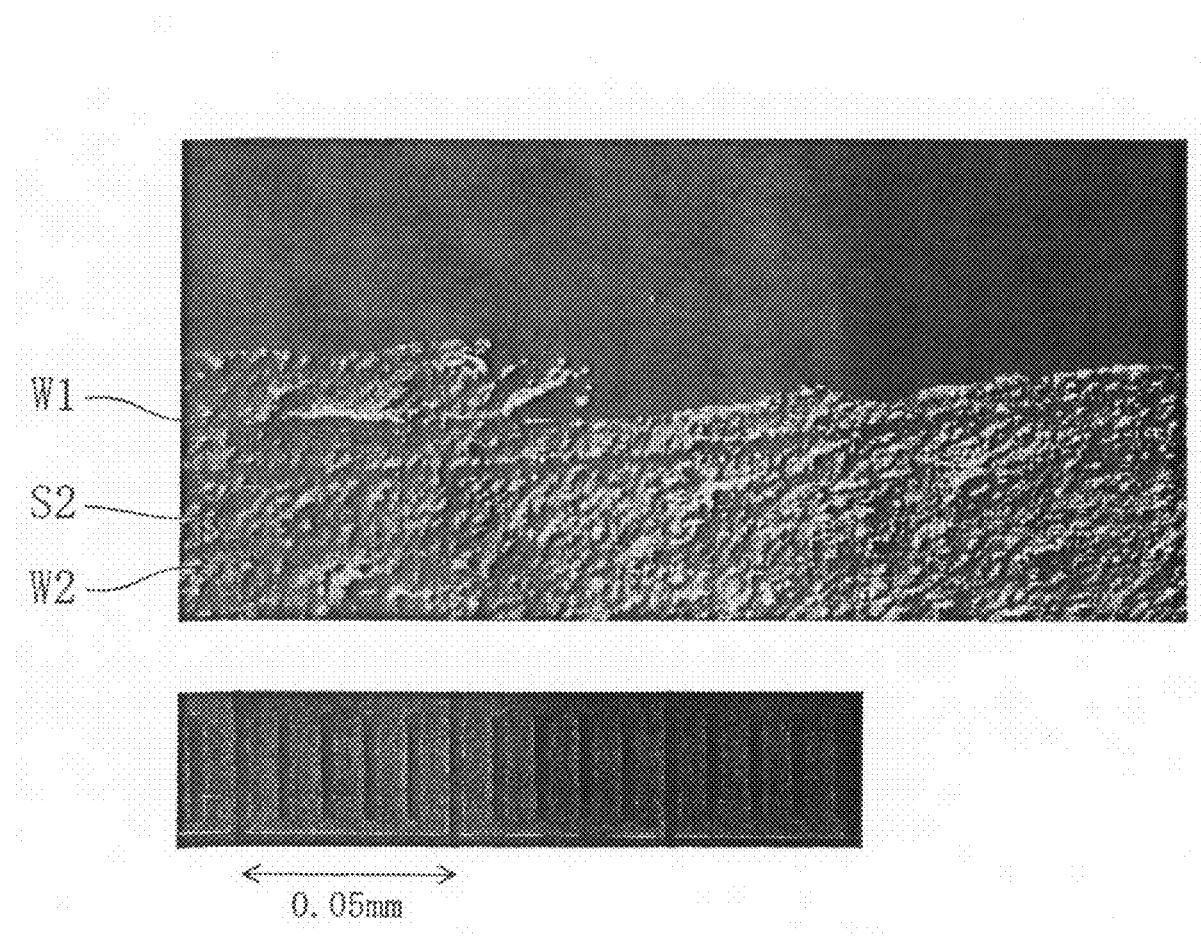
FIG. 8 is a section showing, in an enlarged scale, an encircled part C in FIG. 7.

Referring to the work W, a 6000 series aluminum alloy of 1 mm in thickness was used as the first plate member W1 and a 5000 series aluminum alloy of 2 mm in thickness was used as the second plate member W2. The work W was joined using the aforementioned friction point joining apparatus in which the pressure of the rotary tool 4 was set to be 3.92 kN, the number of rotation thereof was set to be 3500 rpm and the joining period was set to be 0.8 sec. The joint part obtained is shown in an enlarged scale in FIG. 7. It is understood that the bulging portion 63 was formed excellently in the friction spot joint structure in Working Example 2. It was found, as shown in an enlarged scale in FIG. 8, that the continuous interface S2 between the first plate member W1 and the second plate member W2 was formed at the bottom (encircled part C in FIG. 7) of the concave portion 61.

What is claimed is:

1. A method for obtaining a friction spot joint structure in which a first plate member and a second plate member are point joined with each other by plastic flow to form a joined part, said method comprising:

providing a rotary tool the rotary tool having a pin portion at a tip end thereof and a shoulder portion having a larger diameter than that of the pin portion at a base end of the pin portion; and a receiving member arranged so as to face the rotary tool in an axial direction of a rotary axis;

overlapping the first plate member and the second plate member with each other and interposing them between the rotary tool and the receiving member arranged so as to face each other, pressing the pin portion into the first plate member while rotating the rotary tool, and pressing the shoulder portion against the first plate member thereby forming a concave portion by the pin portion, the concave portion including a continuous interface between the first plate member and the second plate member, forming an annular bulging portion of the second plate member inside the first plate member and protruding into the first plate member around an entire outer periphery of the concave portion, and forming a protruding portion protruding outward in the radial direction from the annular bulging portion to encroach into the first plate member to anchor the first plate member with respect to the second plate member, wherein the first and second plate members are joined with each other by the annular bulging portion and the protruding portion created by plastic flow in a solid phase state.

2. The method for obtaining a friction spot joint structure of claim 1, wherein the first plate member and the second plate member are made of a light metal.

3. The method for obtaining a friction spot joint structure of claim 2, wherein the first plate member and the second plate member are made of the same light metal.

4. The method for obtaining a friction spot joint structure of claim 2, wherein the first plate member and the second plate member are made of different light metals.

* * * * *